June 23, 1936.   J. W. ARNOLD   2,044,765
LUBRICATOR FOR PNEUMATIC TOOLS
Filed June 17, 1933
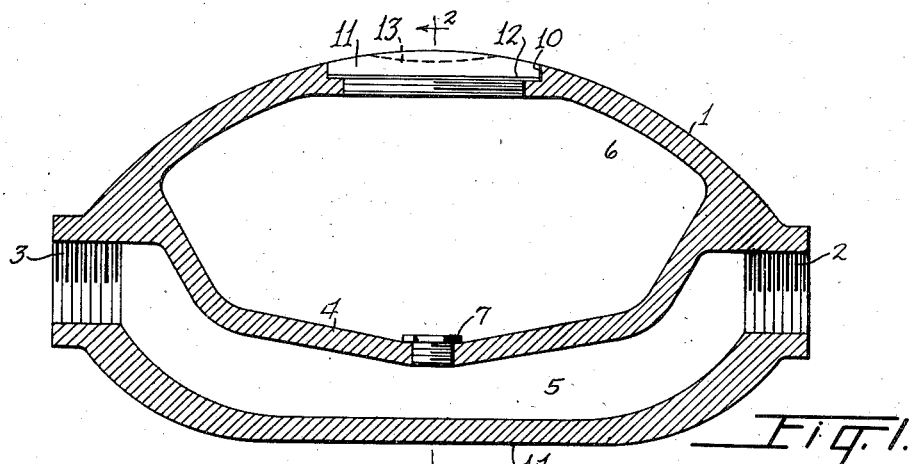
Fig.1.
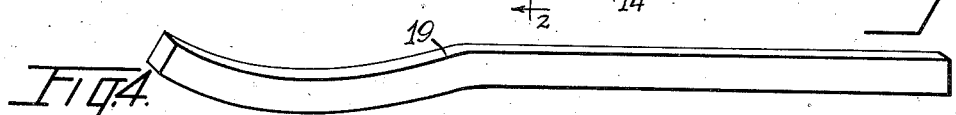
Fig.4.
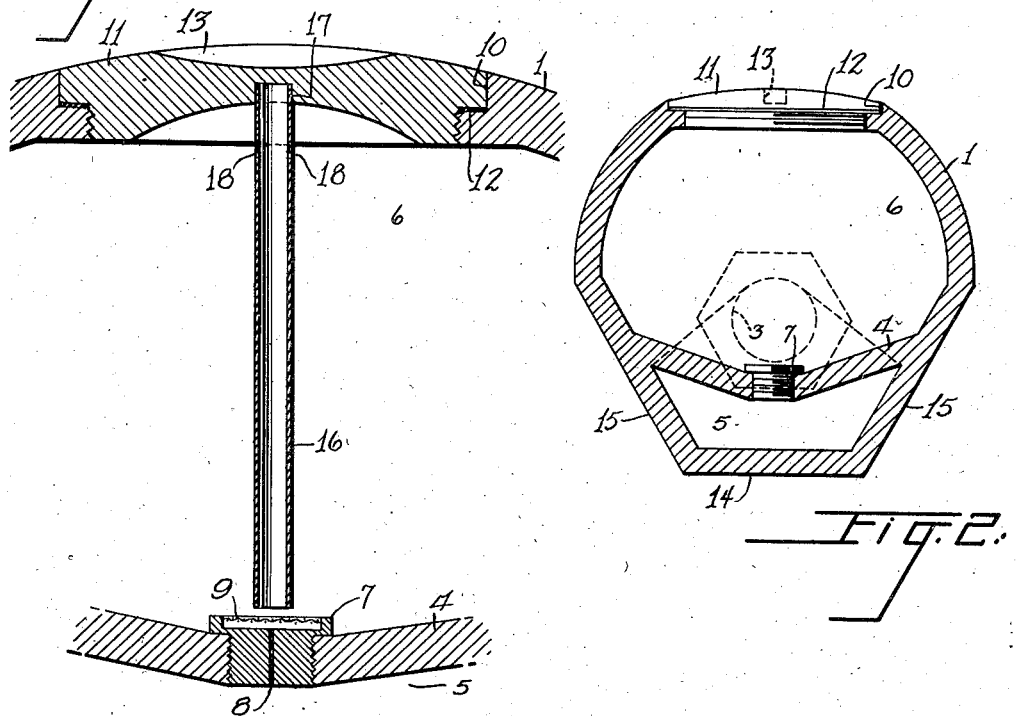
Fig.3.   Fig.2.
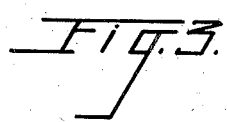
INVENTOR.
JOHN W. ARNOLD
BY
ATTORNEYS.

Patented June 23, 1936

2,044,765

UNITED STATES PATENT OFFICE 2,044,765

LUBRICATOR FOR PNEUMATIC TOOLS

John W. Arnold, San Francisco, Calif.

Application June 17, 1933, Serial No. 676,378

8 Claims. (Cl. 184—55)

The present invention relates to improvements in lubricators for pneumatic tools or the like, and its principal object is to provide a lubricator adapted for introduction into the air line through which compressed air is furnished to the tool and which is constructed to feed a slight amount of lubricant into the compressed air for transmission to the working parts of the tool.

The present invention is an improvement over devices illustrated and described in my Patent No. 1,582,368 issued April 27, 1926, and in my copending application Serial No. 447,274, filed April 25, 1930, issued Dec. 19, 1933 as Patent No. 1,940,481.

It is particularly proposed in the present invention to simplify the devices shown in the patent and in the copending application so that the device may be sold at a lower price and may be manufactured much more economically.

Further objects and advantages of my invention will appear as the specification proceeds.

The preferred form of my invention is illustrated in the accompanying drawing in which Figure 1 shows a longitudinal section through my lubricator, Figure 2 a transverse section taken along line 2—2 of Figure 1, Figure 3 an enlarged fragmentary transverse section showing a modified form of my invention, and Figure 4 a perspective view of a wrench used in connection with my lubricator.

While I have shown only the preferred forms of my invention I wish to have it understood that various changes or modifications may be made within the scope of the claims hereto attached without departing from the spirit of the invention.

In its preferred form my lubricator comprises an elongated casing 1 adapted for connection into the air line of a pneumatic tool, and provided for this purpose with threaded end portions 2 and 3. It should be understood that this lubricator is not intended for fastening directly to the tool as in my prior applications, but is intended to be connected into the hose guiding compressed air to the tool, preferably at a distance of some ten feet from the tool so that the lubricator lies on the ground surface and is dragged over the latter as the tool is carried from place to place.

As a rule a ¾ inch hose is used for conducting the air to the lubricator, and a ½ inch hose connecting the lubricator to the tool. The casing, as will be seen from the drawing, is elongated in form and is stream-lined into the contour of the hose so as to interfere as little as possible with turning movements of the hose when the latter is dragged over the ground surface. It is adapted for connection into the hose line in either direction since both parts of the casing are symmetrical on opposite sides of a transverse center line plane.

Inside of the casing I provide a division wall 4 which divides the casing into an air passage 5 communicating with the hose at opposite ends, and an oil chamber 6 above the air passage when the device is in the position indicated in Figure 1. The air passage follows the contour of the bottom of the casing so as to curve downwardly from one end and upwardly again toward the other end.

The oil chamber 6 is connected to the air passage through a plug 7 shown in cross section in Figure 3, and provided with a small port 8 and a strainer 9 disposed above the port. The port itself is of very small diameter, preferably from 7/1000 to 15/1000 of an inch. Different kinds of lubricants require different kinds of port holes, a heavier lubricant taking a larger hole, and a light lubricant a smaller hole. The device can be easily adjusted to heavier and lighter lubricants by exchange of the plug 7. The port is sufficiently small that it will normally resist the flow of oil therethrough. It is the change of pressures in the passage 5 and chamber 6 that causes oil to feed into the passage as needed.

In the upper wall of the casing I provide a hole 10 through which lubricant may be introduced into the chamber 6 and this hole may be closed by means of a cap 11, a washer 12 being interposed between the cap and a ledge formed in the casing. It should be noted that the surface of the cap is stream-lined into the casing, and the cap is manipulated by a special tool shown in Figure 4, comprising a square rod 19 presenting a curvature at one end, which is adapted for introduction into a registering groove 13 in the top of the cap.

The device thus far described operates as follows: A lubricant is introduced into the chamber 6 and the casing is connected into the air hose leading to the pneumatic tool. It should be noted that the connection to the air hose is somewhat below center of the entire casing so that the casing has a tendency to retain the position shown in Figure 1 with the chamber amove the air passage. It will be further noted from Figure 2 that in cross section the upper portion of the casing is rounded, while the lower portion is made angular with a flat bottom face 14 and the flat side faces 15 arranged at an angle to the bottom face. Due to this construction the casing will retain the proper position as indicated in Figures 1 and 2, practically at all times, although it may occur that temporarily the casing will assume a different position and possibly even come to rest upside down when dragged over the ground surface. The important feature is that in the large majority of positions, as the operator moves from place to place and keeps dragging the hose along with him, he will find the casing to occupy the position shown in Figures 1 and 2.

With the casing properly hooked up to the line and the tool inactive, the line pressure of say, one hundred pounds will prevail in the air passage as well as in the chamber itself. When the tool is being worked, the air pressure drops slightly in the air passage, probably to about ninety pounds and a slight amount of lubricant is drawn out of the chamber to mix into the passing air and to be communicated to the tool. Even if the device is turned upside down a spray of lubricant will be drawn into the air passage for delivery to the air tool, although the device works most satisfactorily when in proper position as shown in Figure 1 with the oil chamber disposed above the air passage.

In the device shown in Figure 1 the feed of lubricant into the air passage is at times somewhat irregular depending upon the working conditions. As has been pointed out at the beginning of each operation of the tool, there is a differential in pressure between the oil chamber and the air passage, the oil chamber maintaining its pressure of say, one hundred pounds, while the pressure in the air passage drops at the beginning of the operation to about ninety pounds, and it takes a certain amount of time, say ten or fifteen minutes for the pressure to equalize. It is apparent when there is a differential in pressure, more lubricant will be fed into the air passage than where there is no differential in pressure, which means that during the initial period of operation the feed of lubricant will be heavier than if the operation has continued for a certain length of time. Where the tool is in continuous operation it makes comparatively little difference because after a few minutes of operation the pressures will have equalized and from then on the oil feed will be reduced to proper proportions, while at the beginning the oil feed is somewhat in excess of what is necessary for best results. Where the work is interrupted frequently so that there are many initial periods with differentials in pressure, the oil feed is too heavy and the chamber empties more quickly than is desirable for best results, it being intended that one filling of the chamber should last for one day, or longer.

In order to improve on this condition I provide the modified form of Figure 3 in which a tube 16 is secured to the cap as at 17, and projects through the chamber into close proximity to the strainer 9 and the port 8 in the plug 7. This tube is provided with apertures 18 near the cap 11. With this tube in the position indicated it seems that upon starting, oil will be drawn from the tube and the reservoir. The oil in the tube is not replaced because the openings 18 are normally above the oil level in the reservoir. After all of the oil has been withdrawn from the tube, air will be drawn therethrough and this air, mixing with the oil, will decrease the supply of oil fed to the air line.

I also find that the introduction of the tube 16 improves the operation of the device in another respect. When the casing happens to be turned upside down during the initial period of operation, the excess pressure within the chamber in combination with the suction which is particularly active on the tube has a tendency to force the oil through the apertures 18 into the tube for discharge through the port 8. The tube 16 thus has a tendency to increase the flow of oil when the casing happens to be in an upside down position in which at times, particularly when the chamber is not quite filled with oil, the oil might be out of reach from the passing air. The suction is particularly active on the tube 16 because the tube has its open end disposed close to the port 8 and the suction in the port 8 creates a suction in the area immediately surrounding the port and this area is occupied by the tube 16. This will draw oil from the tube and deliver it to the passage 5 through the port 8 sooner than it will draw oil from the larger body of the liquid disposed in the compartment 6. When the device is turned upside down the same result will follow and this will cause the oil level in the tube 16 to be higher than the level in the compartment 6. The tube therefore increases the tendency of the oil to flow into the passage 5 when the device is upside down than where no tube is provided. During actual use, however, the device will not always remain in an upside down position. The hose to which the device is attached is frequently moved and the tendency of the device will be to right itself and to come to rest either on the bottom surface 14 or on the inclined walls 15.

I claim:

1. In a lubricating device for a pneumatic tool, an elongated casing having a longitudinal air passage adjacent the bottom thereof, means for connecting the air passage into the air line of a tool and an oil chamber above said air passage with a port leading from the chamber to the air passage, the casing being connected into the air line below center so as to retain a normal position when being dragged over the ground surface as part of the air line, and the casing having a rounded top surface and a flattened bottom face to facilitate return to a normal position from any rolling excursion.

2. In a lubricating device for a pneumatic tool, a casing having an air passage adjacent the bottom thereof, means for connecting the air passage into the air line of a tool, an oil chamber above the air passage, a restricted port leading from the oil chamber to the air passage, and a tube within the oil chamber having an opening presented in close proximity to the port and in alignment therewith and having another opening in the opposite portion of the oil chamber.

3. In a lubricating device for a pneumatic tool, a casing having an air passage adjacent the bottom thereof, means for connecting the air passage into the air line of a tool, an oil chamber above the air passage, a restricted port leading from the oil chamber to the air passage, a cap for the oil chamber arranged oppositely the port and a tube projecting from the cap into close proximity of the port and having an opening near the cap.

4. In a lubricating device for a pneumatic tool, a substantially oval casing having end openings for hose connections disposed intermediate its height and a partition running substantially parallel to the bottom of the casing so as to form a passageway connecting the end openings and to form a substantially oval oil chamber above the passage way, the partition having a port connecting the chamber and the passageway, the bottom of the casing being flattened and the end openings being below the center line of the casing so as to cause the casing to normally retain an upright position when dragged over the ground surface as part of a hose.

5. A lubricating device for a pneumatic tool comprising a substantially oval casing having end openings for hose connections disposed intermediate its height and a partition running substantially parallel to the bottom of the casing so as to form a passageway connecting the end openings and to form an oil chamber above the passageway, the partition having a port connecting the chamber and the passageway, the bottom of the casing being flattened and having inclined side walls, and the openings being below the center line of the casing so as to cause the casing to normally retain an upright position when dragged over the ground surface as part of a hose, the casing normally sliding on its bottom or inclined side walls.

6. In a lubricating device for a pneumatic tool, an elongated casing having a longitudinal air passage, means for connecting the air passage into the air line of a tool and an oil chamber above said air passage with a port leading from the chamber to the air passage, the casing being connected into the air line below center so as to retain a normal position when being dragged over the ground surface as part of the air line, and having a rounded top surface and a flattened bottom face to facilitate return to a normal position from any rolling excursion.

7. In a lubricating device for a pneumatic tool, a casing having an air passage, means for connecting the air passage into the air line of a tool, an oil chamber above the air passage, a restricted port leading from the oil chamber to the air passage, and a tube within the oil chamber having an opening presented in close proximity to the port and in alignment therewith and having another opening in the opposite portion of the oil chamber.

8. In a lubricating device for pneumatic tools, an air passageway, an oil chamber disposed adjacent to the passageway, the wall separating the passageway from the chamber having only one port passing therethrough, the port being unobstructed but sufficiently small to normally resist the flow of oil therethrough, but permitting small quantities of oil to be forced through by pressure changes within the passage and chamber.

JOHN W. ARNOLD.